United States Patent

[11] 3,601,681

| [72] | Inventor | Carl Ingvar Boksjo<br>Ludvika, Sweden |
|---|---|---|
| [21] | Appl. No. | 801,253 |
| [22] | Filed | Feb. 24, 1969 |
| [45] | Patented | Aug. 24, 1971 |
| [73] | Assignee | Allmanna Svenska Elektriska Aktiebolaget<br>Vasteras, Sweden |
| [32] | Priority | Feb. 28, 1968 |
| [33] | | Sweden |
| [31] | | 2532/68 |

[54] CONVERTER COMPRISING A RECTIFIER GROUP CONTAINING REACTORS AND AN OVER-CURRENT PROTECTION FOR THE RECTIFIER GROUP
2 Claims, 4 Drawing Figs.

| [52] | U.S. Cl. | 321/11, 321/14 |
|---|---|---|
| [51] | Int. Cl. | H02m 1/18 |
| [50] | Field of Search | 321/11-14 |

[56] References Cited

UNITED STATES PATENTS

| 2,969,495 | 1/1961 | Mosch et al. | 321/14 |
|---|---|---|---|
| 2,282,998 | 5/1942 | Edwards | 321/12 X |
| 2,320,224 | 5/1943 | Edwards | 321/12 |
| 3,067,375 | 12/1962 | Jensen | 321/14 |
| 3,328,667 | 6/1967 | Shaneman | 321/11 X |
| 3,340,457 | 9/1967 | Schmitz | (321)/(45 C) |
| 3,355,654 | 11/1967 | Risberg | (321)/(45 ER) |
| 3,386,027 | 5/1968 | Kilgore et al. | 321/11 |

FOREIGN PATENTS

| 1,119,985 | 12/1961 | Germany | 321/14 |
|---|---|---|---|

*Primary Examiner*—William M. Shoop, Jr.
*Attorney*—Jennings Bailey, Jr.

ABSTRACT: A converter is formed of a group of rectifiers arranged in series with reactors. A protection device is provided which includes a short-circuiting arrangement for the rectifiers. The reactors are provided with iron cores which are saturated at approximately 1 percent–10 percent of the short-circuiting current of the converter.

INVENTOR.
CARL INGVAR BOKSJÖ
BY
Jennings Bailey, Jr 3,601,681

CONVERTER COMPRISING A RECTIFIER GROUP CONTAINING REACTORS AND AN OVER-CURRENT PROTECTION FOR THE RECTIFIER GROUP

BACKGROUND OF THE INVENTION

1. Field of the Invention

The present invention relates to a converter comprising a rectifier group containing reactors and an overcurrent protection for the rectifier group.

2 The Prior Art

To protect a converter against overcurrents it has previously been considered sufficient, when overcurrents arise, to rapidly block the converter and, if the work comes to the worst, open the AC breaker. Such overcurrents may depend, for example, on external faults in the form of earth faults or internal faults, for example rectifier faults. With the arrival of semiconductor rectifiers for converters for high voltages, such a breaking of the alternating voltage is often not sufficiently rapid and it has therefore been suggested to provide the rectifier group of the converter with short-circuiting members. In rectifier equipment with diodes, such a protection often is the only possibility since rectifier equipment having diodes cannot be blocked. With controlled rectifiers, however, it may be blocked. Even with control rectifiers, however, it may be difficult to obtain effective blocking of the rectifiers when these have become heated due to an overcurrent. On the other hand it is certain that a short-circuiting can substantially always be effected, but the inductances of the rectifiers should not be overlooked, said inductances being in the form of anode-reactors, current dividers, etc., and often so large that the energy in them is more than sufficient to destroy the rectifiers during and after short-circuiting, particularly since even the most rapid short-circuiting is so slow that the short-circuiting current has time to develop to a dangerous value before short-circuiting becomes effective.

SUMMARY OF THE INVENTION

The invention aims at limiting the energy in said reactors and this is done by making them saturatable. As a suggestion, the reactors may be provided with iron cores so dimensioned that their saturation current is only a fractional part of the short-circuiting current of the converter, for example 1 percent — 10 percent of the short-circuiting current.

Iron cored reactors are therefore used which, within the lower current ranges, give the required inductance while saturation brings about the desired limitation of the energy in the reactors at higher currents so that the strain on the rectifiers after short-circuiting is kept within permissible limits.

BRIEF DESCRIPTION OF THE DRAWINGS

The invention will be further described with reference to the accompany drawings where FIG. 1 shows a converter with a short-circuiting means according to the invention, while

DESCRIPTION OF THE PREFERRED EMBODIMENTS

Figure 1:
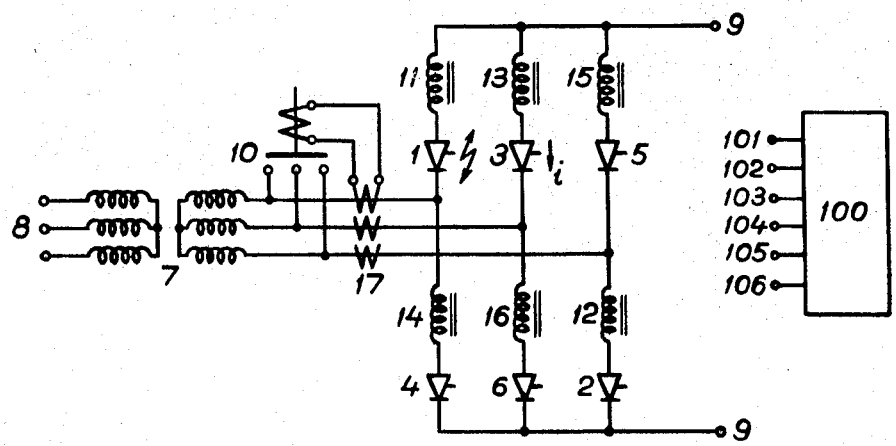

FIG. 1 shows a converter comprising a group of rectifiers 1–6, each being provided with an anode-reactor 11–16, respectively. The converter comprises also a converter-transformer 7 having AC terminals 8 and DC terminals 9 on the DC side of the rectifier bridge. The rectifiers 1–6 are shown only as simple thyristors but usually comprise a large number of series and parallel-connected thyristors corresponding to the rated voltage and rated current of the converter. The reactors may possibly be divided into a greater number of smaller reactors which are distributed along the series and parallel-connected thyristors. Furthermore, the converter is provided with a control pulse device 100, the output terminals 101–106 of which are connected to the control electrodes of the various rectifiers 1–6. The converter is here imagined as in rectifier operation and is therefore provided with an overcurrent protection in the form of a short-circuiting device 10, the operating coil of which is connected to a system of current transformers 17 in the AC connections to the rectifier bridge.

As an example of a fault which may give rise to dangerous overcurrents in the rectifier connection, external short-circuiting of the rectifier 1 may be imagined, for example due to flashover on a bushing. In this way a short-circuiting circuit arises comprising rectifier 3 and anode-reactor 13 and the corresponding two phases of the rectifier winding of the converter-transformer 7. The voltage over said two phases of the converter-transformer will therefore increase the current "$i$" to a value corresponding to the impedance in said short-circuiting circuit. As a purely conventional precaution the control pulses might be blocked from the control pulse device 100 to the rectifiers in the rectifier connection so that the short circuit is broken when rectifier 3 takes up blocking voltage when the current passes zero. However, it is probable that the rectifier 3 will already have been destroyed by the short-circuiting current. The blocking may also easily be too late to prevent ignition of the rectifier 5 so that this is also short-circuited. It must therefore be considered that blocking of the rectifier group, particularly in the case of semiconductor rectifiers, usually provides an extremely unreliable overcurrent protection.

Instead an overcurrent protection has been introduced in the form of the short-circuiting device 10 shown so that when the current in the above-mentioned short-circuiting circuit exceeds a certain value the current in the pertinent phases of the current-transformer 17 will cause the short-circuiting device 10 to operate so that the voltage which fed the short-circuiting current is short-circuited. The short-circuiting device 10, however, has a certain operating time which is of the same order of magnitude as or greater than a half period of the alternating voltage, so that the short-circuiting current has time to increase to a considerable value before the short-circuiting is effective. In this way a considerable amount of excitation energy will be fed into the anode-reactors 11 and 13 so that the current in the short-circuiting circuit comprising the rectifiers 1 and 3 and their anode-reactors 11 and 13 and the short-circuiting device 10 will only decrease relatively slowly so that the risk of destroying the rectifier 3 has only slightly decreased or perhaps even increased in comparison with the conventional blocking of the rectifiers.

Figure 2A:
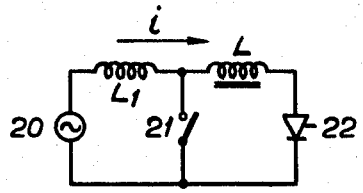
FIG. 2 shows an equivalent diagram for a circuit in the converter and FIG. 3 shows current curves for such an equivalent circuit.
Figure 2B:
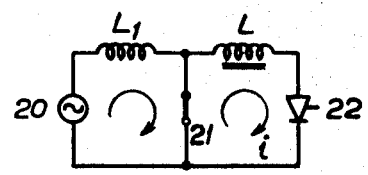

In order to further explain the idea of the invention equivalent diagrams have been drawn in FIGS. 2a and b for the above-mentioned short-circuiting circuits. These figures show a current circuit comprising an alternating voltage source 20 and a rectifier 22 together with reactors L1 and L, where the reactor L1 symbolizes the outer reactances in the short-circuiting circuit, principally the transformer inductance, while L represents the inductance of the anode-reactors. As long as the short-circuiting device 21 is open the voltage from 20 will feed a short-circuiting current "$i$" into the circuit according to FIG. 2a. When the short-circuiting device 21 has closed the circuit according to FIG. 2a will be divided into two circuits independent of each other, as shown in FIG. 2b. The left-hand one of these circuits comprises the alternating current circuit and it is clear that on the AC side of the converter there must be an overcurrent protection, for example in the form of a breaker in order to break the short-circuiting circuit comprising the alternating voltage source 20 which corresponds to the AC network to which the converter is connected and the inductance L1 for this AC circuit. The overcurrent protection for the AC side, however, is of no interest in the problem according to the present invention and has therefore not been shown in FIG. 1.

The right-hand circuit comprises the rectifier circuit and since the resistance in this circuit is relatively small the current "$i$" will only decrease rather slowly and its energy will for the most part be taken up by the rectifier 22.

Figure 3:
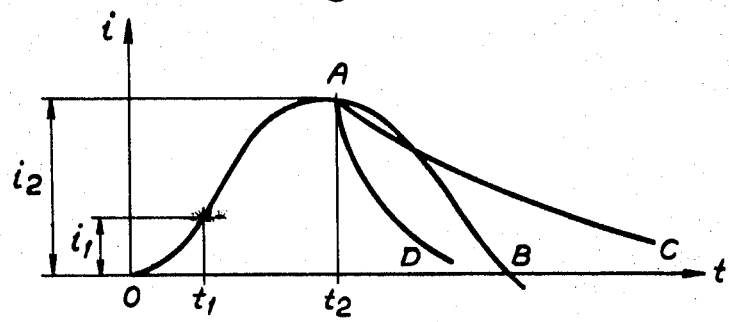

The current conditions are better illustrated in FIG. 3 and, if the short-circuiting device 21 is disregarded, the short-circuiting current "$i$" will follow the curve O-A-B, i.e. increase to its maximum value after which, due to the change of polarity in the alternating voltage source 20, it is forced down to zero and possibly changes direction, as indicated where the current curve intersects the abscissa axis at point B. This case corresponds to an overcurrent protection in the form of the above-mentioned blocking. If the short-circuiting device 10, 21 respectively, is then taken into consideration, this will operate at a certain value of the overcurrent, for example the value $i_1$, as indicated in FIG. 3 so that the short-circuiting device receives a starting pulse at the moment $t_1$. Due to the operating time of the short-circuiting device, however, it should be taken into consideration that the current in the short-circuiting circuit has time to increase to approximately maximum value $i_2$ before the short-circuiting becomes effective at the moment $t_2$. However, if it is a question of conventional anode-reactors, for example in the form of air reactors having linear characteristic, the current in the right-hand circuit in FIG. 2b will only decrease rather slowly, for example in accordance with the curve A-C in FIG. 3. If, however, the anode-reactors symbolized by L in FIG. 2 are designed as iron core reactors having a saturation value which is perhaps of the order of magnitude of 10 percent of the maximum short-circuiting current $i_2$ the energy stored in the reactor L, even at maximum value $i_2$ of the short-circuiting current, will be limited so that the short-circuiting current "$i$" will decrease rather rapidly, for example according to the curve A-D in FIG. 3.

Thus, by limiting the energy stored in the reactors by making said reactors saturatable it is possible according to the invention to achieve that the energy to be discharged through the rectifiers in the event of a fault will be so little that a short-circuiting device can be used as effective overcurrent protection for the converter-rectifiers.

In the previous example rectifier equipment has been mentioned which is provided with anode-reactors and with a short-circuiting means on the AC side. The invention can equally well be used, however, regardless of whether the converter operates as a rectifier or an inverter and reactors other than anode-reactors, for example reactors for current or voltage dividing, may be used. The short-circuiting device may also be arranged on the DC side, possibly on both sides.

In any case it is possible to draw up equivalent diagrams corresponding to FIG. 2 for various connections and possible faults and thus analyze the types of short-circuiting currents and overcurrents arising under various conditions and the maximum value and curve shape of which depend to a great extent on the type and occurrence of the fault.

I claim:

1. Converter comprising a rectifier group containing reactors in series with the rectifiers and an overcurrent protection means for the rectifier group comprising short-circuiting means for short-circuiting the series connection of said reactors and said rectifier group, said reactors being provided with iron cores which are saturated at a fractional part of the short-circuiting current of the converter.

2. Converter according to claim 1, in which the saturation value for said reactors is approximately 1 percent —10 percent of the short-circuiting current of the converter.